Figure 1:
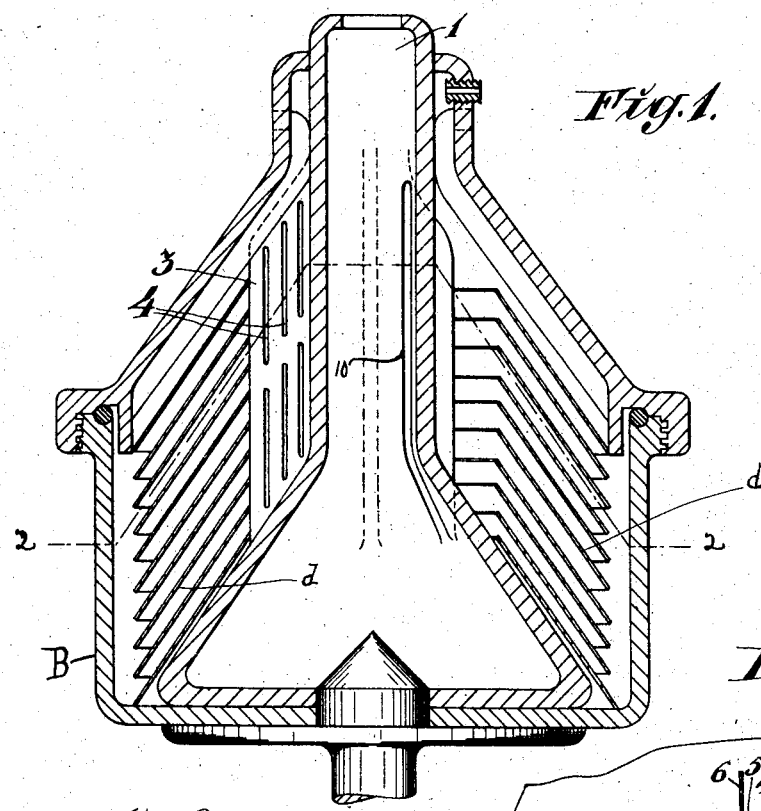

No. 784,231. PATENTED MAR. 7, 1905.
E. G. N. SALENIUS.
CENTRIFUGAL SEPARATING APPARATUS.
APPLICATION FILED OCT. 24, 1904.

Witnesses:
S. William Lutton.
Emily C. Hodges

Inventor:
Eric Gustaf Nicolaus Salenius,
by Crosby & Gregory
Attys.

No. 784,231. Patented March 7, 1905.

UNITED STATES PATENT OFFICE.

ERIC GUSTAF NICOLAUS SALENIUS, OF STOCKHOLM, SWEDEN.

CENTRIFUGAL SEPARATING APPARATUS.

SPECIFICATION forming part of Letters Patent No. 784,231, dated March 7, 1905.

Application filed October 24, 1904. Serial No. 229,725.

*To all whom it may concern:*

Be it known that I, ERIC GUSTAF NICOLAUS SALENIUS, a subject of the King of Sweden and Norway, and a resident of Odengatan 58, Stockholm, in the Kingdom of Sweden, have invented certain new and useful Improvements in Centrifugal Separating Apparatus, of which the following is a specification, reference being made to the accompanying drawings.

This invention relates to that class of centrifugal separators the imperforate bowls of which are provided with means to divide the liquid into layers or strata, whereby the separation of a compound liquid into its constituent liquids is greatly facilitated. The division of the liquid into layers or strata is effected by arranging a series of plates within the bowl one above the other and inclined upward and inward from near its periphery toward the vertical axis of the bowl—as, for instance, in United States Patent No. 432,719, dated July 22, 1890. In separators of this type means have been devised to effect a more uniform distribution of the compound liquid throughout all the compartments formed by the division-plates, the compound liquid being introduced into the bowl through a central tubular inlet and discharged into the compartments at points between the axis of the bowl and its periphery. Such an arrangement is shown in United States Patent No. 640,358, dated January 2, 1900, and in certain forms shown therein the compound liquid passes from the inlet to lateral chambers and from the outer ends of the chambers to the compartments between the division-plates.

As is well known to those skilled in the art, the different particles of the liquid to be treated are subjected to the separating action of centrifugal force while in the feed-inlet of the bowl, with the result that the most easily separated light particles are in such inlet grouped nearest its center, while the other particles arrange themselves farther from the center in the order of their increasing specific gravity. Consequently a certain amount of work is thus performed in the nature of separation of the particles in the feed-inlet of the bowl; but heretofore no attention has, so far as I am aware, been paid to this fact nor has any attempt been made prior to my invention to take advantage thereof.

In the structures hereinbefore referred to the liquid introduced into the feed-inlet of the bowl is caused to pass thence through distributing ducts, chambers, or other passages and therefrom to the bowl, where the main separation is effected; but in such passage from the feed-inlet all of the particles of the liquid, including those which have already been separated, as described, in the inlet, are again mixed together and must be separated a second time, thereby completely nullifying or taking no advantage of the initial separation.

My present invention has for its object the production of means to prevent, so far as possible, the twofold separation and to take advantage of the initial separation in the feed-inlet, thereby increasing the efficiency of the separator.

The novel features of my invention will be fully described in the subjoined specification and particularly pointed out in the following claims.

Figures 2, 3:
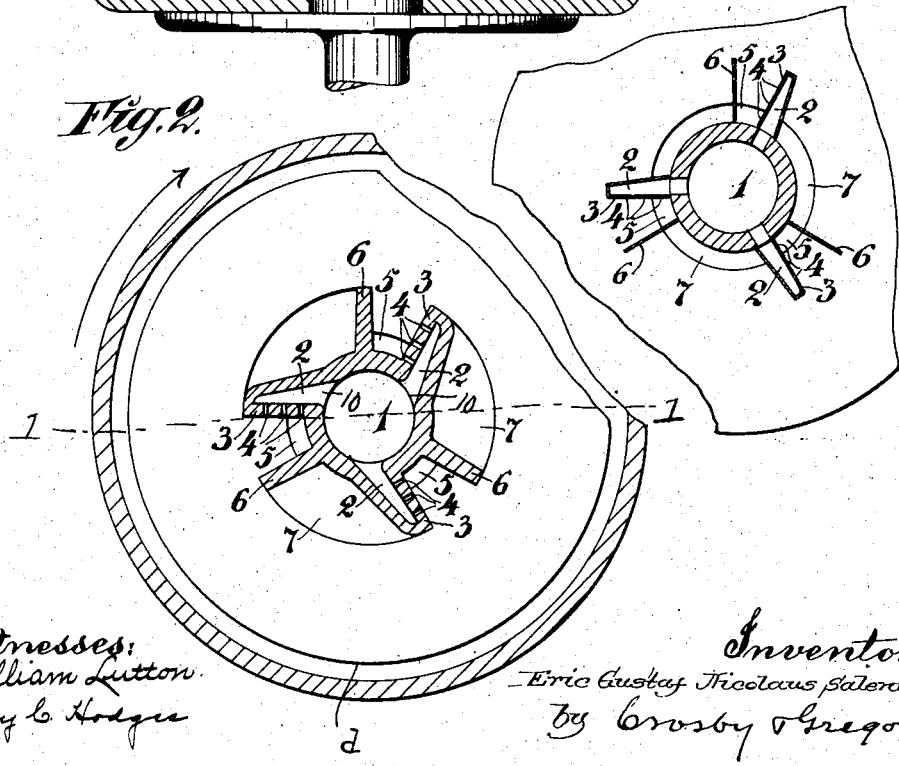

Figure 1 is a vertical section of a centrifugal separator-bowl provided with the superposed conical division plates or disks of the type hereinbefore referred to, taken on the line 1 1, Fig. 2. Fig. 2 is a transverse section thereof on the line 2 2, Fig. 1, looking down; and Fig. 3 is a similar view of a modified construction to be described.

The bowl B, having a vertical tubular feed-inlet 1 coaxial therewith, and the superposed division-plates *d*, extending inward and upward from near the periphery of the bowl toward its central axis, may be and are all substantially of well-known construction. The feed-inlet communicates, by means of elongated longitudinal orifices 10, with upright chambers 2, extended laterally from the inlet, the orifices extending substantially the length of the chambers at their inner sides. Herein the chambers 2 are formed in hollow wings, which may be integral with the tubular inlet 1. I prefer to form the rear wall 3 of each chamber (with relation to the direction of rotation of the bowl) in a vertical radial plane, (see Fig. 2,) and it is provided with outlet-orifices 4, occupying more or less of the total width of the wall and arranged along the same throughout its length. This is clearly shown at the left, Fig. 1. The outlet-orifices are non-radial, and it will be noted that they constitute the only means whereby liquid may pass from the chambers 2.

During the separation process a portion of the liquid introduced, such as milk, will momentarily be within the chambers 2, through which all of the liquid passes, and, as has been stated, a quantity of the light particles of the liquid—viz., such as are most easily separated—will be grouped nearest the axis of the bowl and the other particles farther away, according to their specific gravity. If the liquid to be separated is milk, the cream particles separated in the feed-inlet, as well as the other component parts of the milk, will pass into the chambers 2 and out of the outlet-orifices 4. They will to a great extent maintain in their passage to the chambers 2 the grouping due to the initial separation effected by centrifugal action, and owing to their low specific gravity the cream particles will pass into and will not leave the channels or compartments 5. These are shown on the drawings, Fig. 2, as just outside the feed-inlet 1, and the cream particles pass from such compartments to the cream-outlet without passing outward in the bowl. The other parts of the milk enter the bowl between the division-plates and the separation process is continued in well-known manner, the cream so separated moving toward the compartments or channels 5, while the skim-milk passes toward the periphery of the bowl and leaves the same as usual. Such compartments 5 may be the spaces formed between the chambers 2, or they may be formed between the rear walls 3 of said chambers and preferably radial upright walls 6, arranged behind and at a suitable distance from the wall 3 and extending outward from the inlet 1. In the compartments 7, between the walls 6 and the front walls of the chambers, as well as in the compartments 5, are collected the cream particles separated in the bowl. The division-plates of the latter may extend into any or all of the compartments 5 and 7, and in Fig. 2 said plates are shown as extended only into the compartments 5.

In Fig. 3 the plates are shown as extended into the compartments 5 and 7. Such extensions need not necessarily form parts of the inclined plates of the bowl, as they may, if desired, form part of or be connected with the upright walls forming the compartments 5 and 7.

While I have shown the outlet-orifices 4 as slits, they may be of any other suitable form, and the chambers 2 may be made integral with the feed-inlet 1, as in Fig. 2, or they may be made separately and secured thereto, as shown in Fig. 3.

By the construction shown and described I take advantage of the initial separation of particles separated in the feed-inlet by centrifugal action and prevent the mixing and subsequent reseparation thereof.

Having fully described my invention, what I claim as new, and desire to secure by Letters Patent, is—

1. In a centrifugal separator comprising a separating-bowl provided with inclined division-plates, the combination with a central feed-inlet for the compound liquid, extending vertically through the bowl, of lateral chambers communicating throughout their length with said inlet, the rear walls of the chambers having outlet-orifices arranged to permit the passage therethrough of the separated particles as grouped by centrifugal action.

2. In a centrifugal separator of the class described, in combination, a central, vertical feed-inlet for the compound liquid, extending the length of the bowl, and lateral, upright chambers communicating at their inner sides with the inlet, the rear walls of the chambers having outlet-orifices, to maintain the separation of the particles of the compound liquid effected by centrifugal action in the feed-inlet.

3. In a centrifugal separator comprising a separating-bowl having inclined division-plates extending from near its periphery upward and inward toward its axis, in combination, a vertical feed-inlet for the compound liquid, coaxial with the bowl and extended thereinto, lateral chambers communicating at their inner sides with the inlet, and provided with outlet-orifices in their rear walls, opening into the spaces between the division-plates and arranged to permit exit of the separated particles from the chambers in the grouping effected by centrifugal action within the inlet.

4. In a centrifugal separator comprising a separating-bowl having inclined division-plates extending from near its periphery upward and inward toward its axis, in combination, means to introduce the compound liquid into the bowl at the center thereof and to distribute the liquid between adjacent division-plates, and means to prevent commingling of particles separated by centrifugal action upon the incoming compound liquid at the center of the bowl.

5. In a centrifugal separator comprising a separating-bowl having inclined division-plates extending from near its periphery upward and inward toward its axis, in combination, a vertical tubular inlet for the compound liquid, coaxial with the bowl and extended thereinto, upright distributing-chambers extended laterally from said inlet and communicating therewith throughout their length, the rear walls of the chambers having outlet-orifices communicating with the spaces between the division-plates, and upright walls extended radially from the inlet behind the rear walls of the said chambers.

6. In a centrifugal separator comprising a separating-bowl having inclined division-plates extending from near its periphery upward and inward toward its axis, in combination, a vertical tubular inlet for the compound liquid, coaxial with the bowl and extended thereinto, upright distributing-chambers extended laterally from and communicating with said inlet throughout their length, the rear wall of each chamber being radial with relation to the bowl, said rear walls having outlet-orifices for the passage of particles in the separation or grouping effected in the tubular inlet by centrifugal action.

In witness whereof I have hereunto set my hand in presence of two witnesses.

ERIC GUSTAF NICOLAUS SALENIUS.

Witnesses:
 CARL TH. SUNDHOLM,
 HANS B. OHLSSON.